(12) United States Patent
Idris et al.

(10) Patent No.: US 11,587,388 B2
(45) Date of Patent: Feb. 21, 2023

(54) DETERMINING A PLAYER'S EMOTIONAL STATE USING PLAYER GAZE MOVEMENT AT GAMING DEVICES

(71) Applicant: IGT, Las Vegas, NV (US)

(72) Inventors: Fayez Idris, Dieppe (CA); Yue Hang Tang, Riverview (CA); Michael Russ, Graz Styria (AT)

(73) Assignee: IGT, Las Vegas, NV (US)

( * ) Notice: Subject to any disclaimer, the term of this patent is extended or adjusted under 35 U.S.C. 154(b) by 129 days.

(21) Appl. No.: 17/236,417

(22) Filed: Apr. 21, 2021

(65) Prior Publication Data

US 2021/0335086 A1 Oct. 28, 2021

Related U.S. Application Data

(60) Provisional application No. 63/013,898, filed on Apr. 22, 2020.

(51) Int. Cl.
| | |
|---|---|
| *G07F 17/32* | (2006.01) |
| *G06T 7/70* | (2017.01) |
| *A63F 13/213* | (2014.01) |
| *A63F 13/428* | (2014.01) |
| *A63F 13/655* | (2014.01) |
| *G06V 40/18* | (2022.01) |

(52) U.S. Cl.
CPC ............ *G07F 17/3206* (2013.01); *G06T 7/70* (2017.01); *G07F 17/3211* (2013.01); *G07F 17/3237* (2013.01); *G07F 17/3269* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 4,621,814 A | 11/1986 | Stepan et al. | |
| 8,593,578 B1 | 11/2013 | Geronimi | |
| 8,616,957 B2 | 12/2013 | Schultz et al. | |
| 9,039,526 B2 | 5/2015 | Hilbert | |
| 10,043,281 B2 | 8/2018 | Mallinson et al. | |
| 10,156,900 B2 | 12/2018 | Publicover et al. | |
| 2013/0005443 A1 | 1/2013 | Kosta et al. | |
| 2017/0100032 A1 | 4/2017 | Zakariaie et al. | |
| 2017/0337769 A1 | 11/2017 | Hill | |
| 2019/0099660 A1* | 4/2019 | Nelson | G07F 17/3269 |

FOREIGN PATENT DOCUMENTS

CN 103279969 B 1/2016

* cited by examiner

*Primary Examiner* — Robert T Clarke, Jr.
(74) *Attorney, Agent, or Firm* — Sage Patent Group

(57) ABSTRACT

Gaming devices, systems, and methods include a gaming device that includes a display device and an image capture device to capture a plurality of images of an eye of a player of the gaming device at a plurality of respective times. The gaming device generates, for each image of the plurality of images, gaze direction data indicative of a gaze direction of the eye of the player at the respective time corresponding to the image. The gaming device accesses a player database including player data for a plurality of players, the player data including, for each player, stored gaze data. Based on the gaze direction data and the stored gaze data, the gaming device determines a player parameter value corresponding to a player parameter for the player. Based on the player parameter value, the gaming device modifies a game feature of a wagering game at the gaming device.

18 Claims, 10 Drawing Sheets

800

```
Determine current gameplay data based on play of a wagering game by the
player at the gaming device
802
                              │
                              ▼
Generate a correlation between the current gameplay data and stored
gameplay indicative of historical play of a wagering game
804
                              │
                              ▼
Determine a player parameter value based on the correlation
806
```

*FIG. 8*

DETERMINING A PLAYER'S EMOTIONAL STATE USING PLAYER GAZE MOVEMENT AT GAMING DEVICES

CROSS REFERENCE TO RELATED APPLICATIONS

This application claims domestic priority to U.S. Provisional Patent Application No. 63/013,898, filed on Apr. 22, 2020, the disclosure and content of which is incorporated by reference herein in its entirety.

BACKGROUND

Embodiments described herein relate to the field of gaming devices, such as in a casino environment, and in particular to determining a player's emotional state using player gaze movement at gaming devices. In casinos and other establishments, players may play wagering games using electronic gaming machines (EGMs), such as video gaming terminals, and other gaming devices. EGMs may include other types of systems, such as online gaming systems that enable users to play games using computer devices, such as desktop computers, laptops, tablet computers or smart phones, computer programs for use on a computer device, gaming consoles that are connectable to a display, such as a television or computer screen, and others.

EGMs may be configured to enable players to provide input via buttons, keyboards, touch interfaces, and other input devices. Such input may be used by the EGM to identify the player, to enable or disable game features, or to perform other functions of the EGM. Many conventional gaming devices employ relatively simple input devices, such as buttons or keypads, which limit the features and functionality that can be offered at the gaming device.

SUMMARY

Some embodiments herein are directed to a gaming device. The gaming device includes a display device and an image capture device to capture a plurality of images of an eye of a player of the gaming device at a plurality of respective times. The gaming device further includes a processor circuit and a memory including machine-readable instructions. When executed by the processor circuit, the machine readable instructions cause the processor circuit to generate, for each image of the plurality of images, gaze direction data indicative of a gaze direction of the eye of the player at the respective time corresponding to the image. The machine readable instructions further cause the processor circuit to access a player database including player data for a plurality of players, the player data including, for each player, stored gaze data. The machine readable instructions further cause the processor circuit to, based on the gaze direction data and the stored gaze data, determine a player parameter value corresponding to a player parameter for the player. The machine readable instructions further cause the processor circuit to, based on the player parameter value, modify a game feature of a wagering game at the gaming device.

Some embodiments herein are directed to a system. The system includes a processor circuit and a memory including machine-readable instructions. When executed by the processor circuit, the machine-readable instructions cause the processor circuit to receive, from a gaming device, gaze direction data indicative of a plurality of gaze directions of an eye of a player of the gaming device. The machine readable instructions further cause the processor circuit to access a player database including player data for a plurality of players, the player data including, for each player, stored gaze data. The machine readable instructions further cause the processor circuit to, based on the gaze direction data and the stored gaze data, determine a player parameter value corresponding to a player parameter for the player. The machine readable instructions further cause the processor circuit to, based on the player parameter value, cause a game feature of a wagering game at the gaming device to be modified. The machine readable instructions further cause the processor circuit to update the stored gaze data associated with the player to include the gaze direction data.

Some embodiments herein are directed to a method. The method includes capturing, by an image capture device, plurality of images of an eye of a player of a gaming device at a plurality of respective times. The method further includes generating, for each image of the plurality of images, gaze direction data indicative of a gaze direction of the eye of the player at the respective time corresponding to the image. The method further includes accessing a player database including player data for a plurality of players, the player data including, for each player, stored gaze data. The method further includes, based on the gaze direction data and the stored gaze data, determining a player parameter value corresponding to a player parameter for the player. The method further includes, based on the player parameter value, modifying a game feature of a wagering game at the gaming device.

BRIEF DESCRIPTION OF THE DRAWINGS

FIG. 8 is a schematic block diagram illustrating operations for using gaze direction data correlated with game play data according to some embodiments.

DETAILED DESCRIPTION OF EMBODIMENTS

Figure 1A:
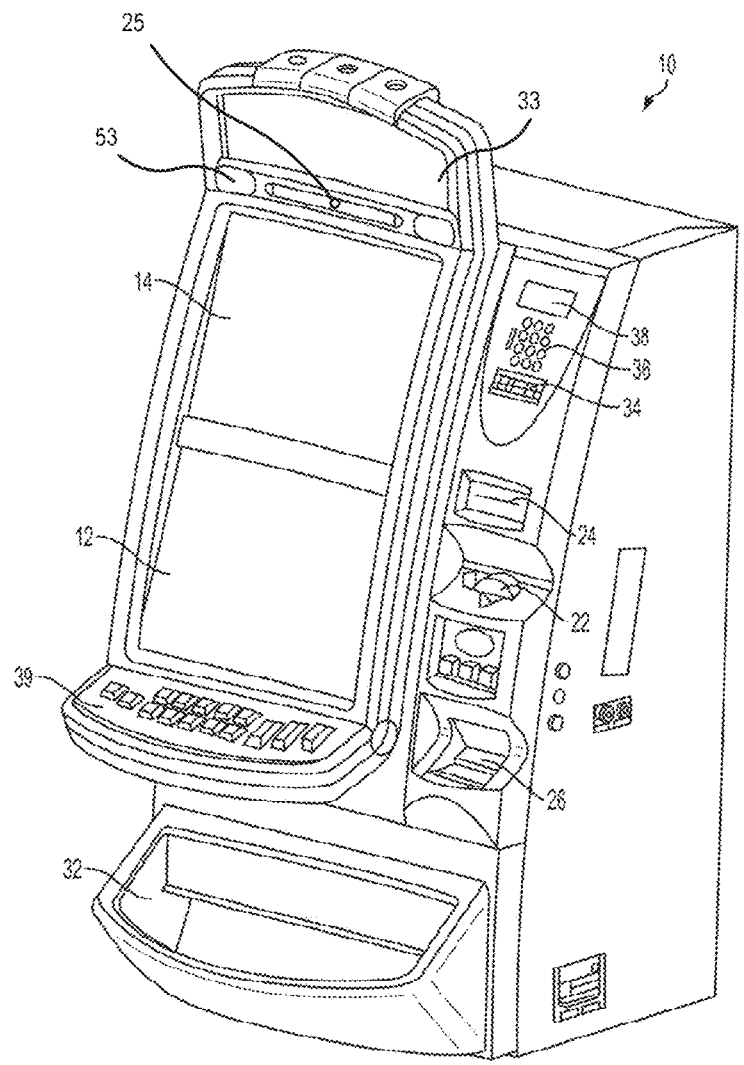
FIG. 1A is a perspective view of an electronic gaming machine according to some embodiments.

Embodiments described herein relate to the field of gaming devices, and in particular to using player gaze movement as biometric input at gaming devices. For example, in some embodiments, an image capture device of a gaming device captures a plurality of images of an eye of a player of the gaming device at a plurality of respective times. The gaming device generates, for each image of the plurality of images, gaze direction data indicative of a gaze direction of the eye of the player at the respective time corresponding to the image. The gaming device also accesses a player database including player data, including stored gaze data, for a plurality of players. Based on the gaze direction data and the stored gaze data, the gaming device determines a player parameter value corresponding to a player parameter for the player, and modifies a game feature of a wagering game at the gaming device, based on the player parameter value.

In some examples, gaming devices may use the player's eye movement for authentication and identification, and/or to trigger game features, such as controlling access to certain games or game features. Eye movement may be tracked periodically or continuously, as desired, such as to trigger certain game actions and/or specific features during game play.

Players' eye movement may be tracked using an eye tracking device and/or a camera system, to detect the player tracking an object or performing a pattern. Based on the eye movement, the gaming device can determine the position, velocity, acceleration, and/or angle of the players gaze over time, and can derive a number of statistical features therefrom, such as average, standard deviation, skewness, kurtosis dispersion, minimum, and maximum for different parameters. These and other statistical features can be used to train a model for player identification, such as an artificial intelligence (AI)/machine learning model.

Player identification can also be independently confirmed, for example via additional verification about the player's wagering behavior on the gaming device. For example, if two players show very similar eye movement patterns, the system can analyze the player's wagering patterns, such as wager amount, time between spins, frequency of wager adjustment, etc., to confirm the player's identity. If abnormal wager behavior is detected based on the player's profile, certain features can be disabled or enabled.

While a player is playing a game, features such as eye movement speed and acceleration and statistical features can be used to classify the player's emotional state, such as positive and negative emotions, and adjust user interface elements (e.g., graphics, music, etc.) accordingly. For example, statistical patterns of player's readiness to bet may be stored in a player database, based in part on stored eye movement data. These patterns can be further enhanced, modified, and or updated over time. For example, the system could continuously track eye movement to analyze player's attention towards the game over time, to determine levels of distraction, boredom, fatigue, etc. The system could trigger certain game actions to re-engage the player's attention.

In some embodiments, eye movement data can be used as a continuous authentication tool, either alone or in combination with other authentication methods, such as user login or hard biometric data (e.g., fingerprint, facial recognition, etc.). One benefit would be that players would not need to carry authentication devices, such as tracking cards, which can be lost or misplaced. For example, in skill based games, the gaming device can continuously ensure that the same player is playing the game. Personalized offerings, such as a bonus round or credits specific to the player, may also be provided to the player without requiring the player to reauthenticate at the gaming device. Another benefit is that no physical contact with the gaming device by the player may be required.

In some examples, unauthorized and/or accidental access to input devices of the gaming device, such as a digital button panel or hard buttons, may be prevented. By monitoring the player's eye movements, access may be granted to the input devices only when the player is ready to bet. Otherwise, access could be blocked when the player is not ready. The readiness of the player may be tracked and compared to patterns correlated to the player's readiness to wager. If the player is not ready, certain features, such as changing wager amount, initiating the spin button, cash out, etc., can be blocked by the system. Similarly, when a player leaves the gaming device and later returns, unlocking and/or resuming play from a paused state may be accomplished without requiring the player to re-authenticate.

In some embodiments, the gaming device may be locked and/or unlocked by the player "drawing" an eye movement pattern (such as a circle, triangle, etc.). In some embodiments, eye movement may also be used to prove that a player is human, such as when filling forms or questionnaires. For example, eye movement data can be used to provide human verification by asking the player to simply look at a certain spot on the screen, provide an eye movement pattern, etc. Eye movement can also be used to measure if a player has followed the instructions as intended, e.g. when reading an agreeing to a user agreement and/or conditions, to determine if a player has skipped ahead and agreed without reading.

Eye movement data may also be used as part of game play. For example, in a maze game, a player might need to solve the game (e.g., find the correct path) via eye movement only. The game could give the player a time limit (e.g., countdown) in which to find the right path. The system could also analyze the eye movement patterns of the same player over multiple mazes to analyze the system how the player is looking for the right path. Analyzing those patterns could be used to further increase mazes' difficulty by offering a maze which's solution is different than the player's preferred eye movement patterns. The system may also analyze eye movement from multiple players to analyze and derive different clusters of users having different categories of preferred eye movement patterns. The system may also collect and analyze eye movement patterns of players at different games and features to identify if players' eye movements correspond to eye movements that are intended by the game designers. In some examples, visualizations of the eye movement may be streamed back to an operator to evaluate and review eye movement patterns for better game design.

In some examples, a game could trigger an action (e.g., bonus award) just after the player has moved their eyes over all checkpoints before reaching the finish, with the bonus award being awarded only if player viewed all the checkpoints. Based on eye movement during the game, the system could also adjust game settings or trigger game actions accordingly. For example, a player might be prompted to "draw a circle" to spin reels, to "draw an upward/downward zig-zag pattern" to increase/decrease bet, and/or to blink their eyes to start and/or stop an eye movement gesture. In some examples, the system could differentiate between single- and dual-eye movement gestures. Eye movement gestures may also be personalized, e.g., defined by the player to map different gestures to different game actions.

In an EGM, which is a type of gaming device according to some embodiments, the operation of the EGM, and in particular the operation of the EGM to operate and/or display at least one of the concurrently displayed games, may be controlled in response to the player's eye gaze. In particular, in some embodiments, an aspect of one of the concurrently displayed games may be controlled based on whether the EGM determines that the player is looking, or is not looking, at the one of the concurrently displayed games. The use of gaze detection data may be improved and/or augmented by using other secondary inputs in conjunction with the gaze detection data.

The EGM may include at least one data capture camera device that is configured to monitor the eye gaze of the player to collect player eye gaze data. Such monitoring may be performed continuously or selectively when eye gaze data is needed. The graphics processor of the EGM may be configured to generate a plurality of interactive game environments using the game data of a plurality of interactive games. The display device of the EGM may display a viewing area for each of the plurality of interactive games, which may form a portion of the interactive game environment for each game.

The EGM may be configured with algorithms to process recorded image data to detect in real-time the position of the player's eyes in three-dimensional (3D) space and the focus of the player's gaze in two dimensional-space (2D) or 3D space. The position of the player's eyes may be the physical location of the player's eyes in 3D space. The focus of the player's gaze may be the focus of the gaze on a display device of the EGM.

The EGM may have a game controller that can determine the location of the eye gaze of the player relative to the viewing area by mapping the location of the player eye gaze on the display device to the viewing area. The player eye gaze data can be analyzed to determine what the player is looking at. The game controller may trigger a control command to the display controller of the EGM to dynamically update the rendering of the viewing area of one or more of the concurrently displayed games based on the player eye gaze data. For example, in response to the control command, the display controller may control the display device in real-time or near real-time using the graphics processor to dynamically update the rendering of the viewing area to provide a real-time or near real-time graphical animation effect displayed on the display device to update the visible game components in the viewing area based on the player eye gaze data.

The gaming enhancements described herein may be carried out using a physical EGM that may be embodied in a variety of forms, machines and devices including, for example, portable devices, such as tablets and smart phones, that can access a gaming site or a portal (which may access a plurality of gaming sites) via the Internet or other communication path (e.g., a Local Area Network (LAN) or Wide Area Network (WAN)), and so on. The EGM may be located in various venues, such as a casino or an arcade. In this manner, these and other embodiments provide a unique technical solution to the technical problem of accurately evaluating an emotional state of a player of a gaming device and responding to the evaluated emotional state to provide an improved gameplay experience for the player.

Figure 1B:
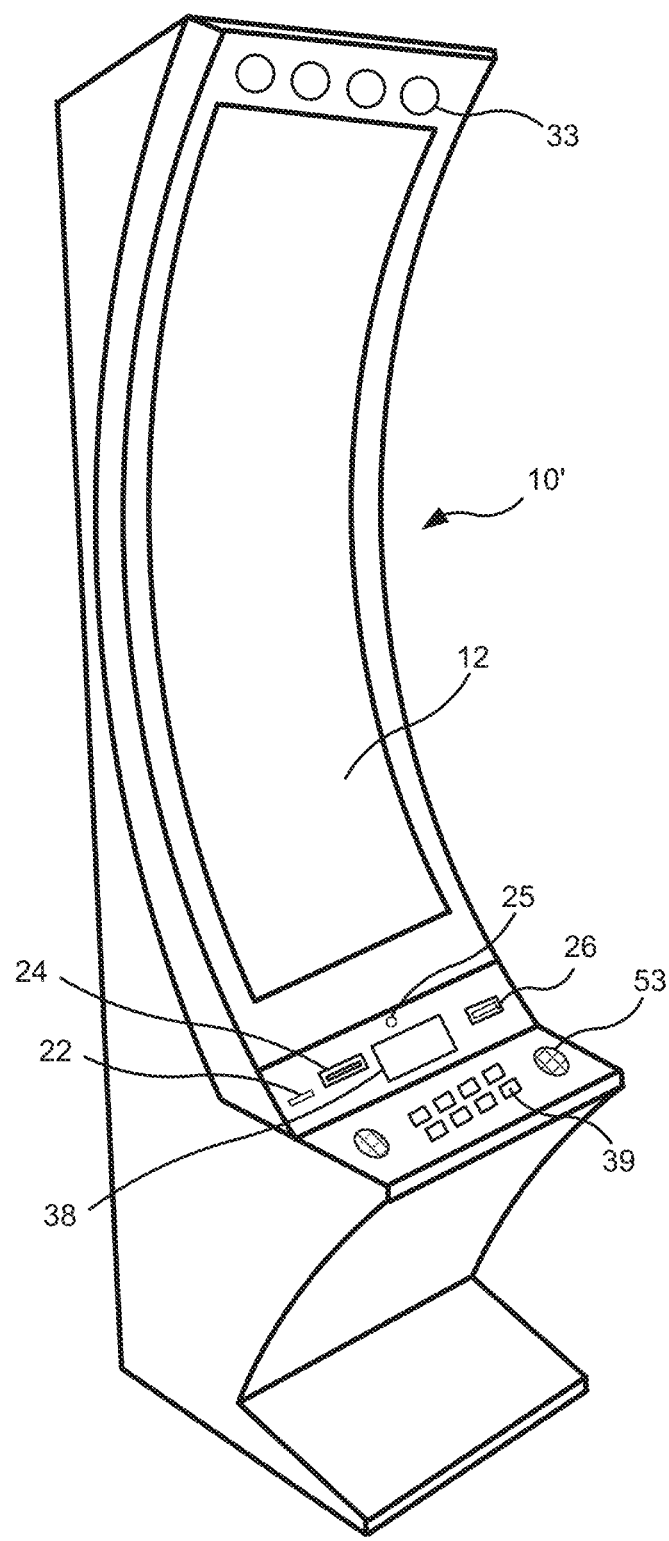
FIG. 1B is a perspective view of an electronic gaming machine according to further embodiments.

FIG. 1A is a perspective view of an EGM 10, and FIG. 1B is a perspective view of an EGM 10', that are configured to monitor eye gaze of a player to collect player eye gaze data, and to control operation of one of a displayed game in response to the player eye gaze data in accordance with some embodiments. A game controller may determine a location of the eye gaze of the player relative to a viewing area of the interactive game environment using the player eye gaze data and triggering a control command to control operation of the displayed game. In particular, a display controller in the EGM may dynamically update the rendering of the viewing area or a portion of the viewing area based on the player eye gaze data.

The EGM 10 has at least one data storage device to store game data for a plurality of interactive games. The data storage device may store game data for one or more primary interactive games and one or more bonus interactive games. The display controller may detect a control command from a game controller of the EGM and responsive to such command may dynamically update the rendering of the viewing area.

The example EGM 10 illustrated in FIG. 1A includes a display device 12 that may include a Thin Film Transistor (TFT) display, a Liquid Crystal Display (LCD), a Cathode Ray Tube (CRT), auto stereoscopic 3D display and Light Emitting Diode (LED) display, an OLED display, or any other type of display. An optional second display device 14 provides game data or other information in addition to display device 12. The display devices 12, 14, may have 2D display capabilities or 3D display capabilities, or both. The second display device 14 may provide static information, such as an advertisement for the game, the rules of the game, pay tables, pay lines, or other information, or may even display the main game or a bonus game along with display device 12. Alternatively, the area for display device 14 may be a display glass for conveying information about the game. Display device 12, 14 may also include a camera, sensor, and other hardware input devices. The display devices 12, 14 may display at least a portion of the visible game components of a plurality of interactive games. In particular, the display devices may simultaneously display a plurality of concurrently active interactive games.

The EGM 10 includes speakers 53 for playing audio associated with the games, which may include background music, sound effects, voiceovers, and other types of sounds. The sounds generated by the EGM 10 may be associated with one or more games playable on the EGM 10.

The EGM 10 further includes accent lights 33 that are separate from the display devices. Activation of the accent lights 33 may be coordinated with the game play of a game on the EGM 10. For example, when the player wins a prize, the accent lights may be activated and caused to flash different colors. The accent lights 33 may, for example, include RGB LEDs that can be programmed to flash or light up in different colors, patterns, brightnesses, etc. The accent lights 33 may be further synchronized with animations displayed on the display device 12, 14 and sounds played on the speakers 53.

In some embodiments, the display device 12, 14 may be a touch sensitive display device. The player may interact with the display device 12, 14 using touch control such as, but not limited to, touch, hold, swipe, and multi-touch controls. The player may use these interactions to manipulate the interactive game environment for easier viewing or preference, to manipulate game elements such as visible game components, or to select at least a portion of the visible game components depending on the design of the game. For example, the player may select one or more visible game components displayed by the display device 12, 14. As another example, the player may not have to touch the display device 12, 14 to play the interactive game. The player may instead interact with the interactive game using their eye gaze, eye gestures, and/or body movements.

The EGM 10 may include a data capture camera device 25 that is configured to continuously detect and monitor player interaction commands (e.g. eye gaze, eye gestures, player movement, touch, gestures) to interact with the viewing area and game components displayed on the display device 12, 14. Images from the data capture camera device 25 are transmitted to a game controller which determines a location of the eye gaze of the player(s) relative to the viewing area using the data provided by the image capture device 25 or other data capture device. In some embodiments, a separate eye gaze tracking module including a data capture device and a processor may be provided. The processor of the eye gaze module may determine a location of the eye gaze of the player relative to the viewing area using the data provided by the data capture device, and the eye gaze tracking module may provide player eye gaze data to the game controller.

Eye gaze data may be captured for multiple players of an EGM 10. Accordingly, the player eye gaze data may include eye gaze data of multiple players. It will be appreciated that any reference herein to a player in the singular may include multiple players.

The data capture camera device 25 may include a single detector configured to capture images of the player or players of the EGM 10 from a single direction or multiple detectors configured to capture images of the player or players from multiple directions. The EGM 10 may be configured to detect the presence and location of multiple players.

In some embodiments, the game controller may trigger a control command to the display controller to dynamically update the rendering of the viewing area based on the player eye gaze data. In response to the control command, the display controller may control the display device in real-time or near real-time using the graphics processor to dynamically update the rendering of the viewing area to provide a real-time or near real-time graphical animation effect displayed on the display device that may represent a visual update to the visible game components in the viewing area, the visual update based on the player eye gaze data. In some embodiments, the control command may be based on the eye gaze, eye gesture, or the movement of the player, or any combination thereof. The eye gaze of the player may be the location on the display device where the player is looking. The eye gesture of the player may be the gesture made by the player using one or more eyes, such as widening the eyes, narrowing the eyes, blinking, and opening one eye and closing the other. The movement of the player may be the movement of the player's body, which may include head movement, hand movement, chest movement, leg movement, foot movement, or any combination thereof. A winning outcome of the game for provision of an award may be triggered based on the eye gaze, eye gesture, or the movement of the player. For example, by looking at a game component displayed by the display controller on the display device 12, 14 for a pre-determined period of time, the player may trigger a winning outcome. The award may include credits, free games, mega pot, small pot, progressive pot, and so on.

The display device 12, 14 may have a touch screen lamination that includes a transparent grid of conductors. Touching the screen may change the capacitance between the conductors, and thereby the X-Y location of the touch may be determined. The X-Y location of the touch may be mapped to positions of interest to detect selection thereof, for example, the game components of the interactive game. A game processor of the EGM 10 associates this X-Y location with a function to be performed. Such touch screens may be used for slot machines, for example, or other types of gaming machines. There may be an upper and lower multi-touch screen in accordance with some embodiments. One or both of display device 12, 14 may be configured to have auto stereoscopic 3D functionality to provide 3D enhancements to the interactive game environment. The touch location positions may be 3D, for example, and mapped to at least one visible game component of the plurality of visible game components.

The EGM 10 may include a physical device for receiving and accepting value from a player, such as a coin, bill, token, printed ticket, magnetic card, or other token of value in return for which the player is granted credits on the EGM 10. For example, a coin acceptor 22 may have a coin slot that accepts coins or tokens in one or more denominations to generate credits within EGM 10 for playing games. A ticket acceptor 24 includes an input slot that receives machine readable printed tickets and outputs printed tickets for use in cashless gaming. A bill acceptor 26 receives and validates paper money deposited by the player.

A coin tray 32 may receive coins or tokens from a hopper upon a win or upon the player cashing out. However, the EGM 10 may be a gaming terminal that does not pay in cash but only issues a printed ticket for cashing in elsewhere. Alternatively, a stored value card may be loaded with credits based on a win, or may enable the assignment of credits to an account associated with a computer system, which may be a computer network connected computer.

In some embodiments, the EGM 10 may include a scanner for scanning a barcode indicative of a cryptocurrency address, such as a bitcoin, litecoin or ethereum address, to permit the EGM 10 to transfer credits to a player in the form of a cryptocurrency.

A card reader 34 may read from various types of cards, such as smart cards, magnetic strip cards, or other types of cards conveying machine readable information. The card reader reads the inserted card for player and credit information for cashless gaming. Card reader 34 may read a magnetic code on a conventional player tracking card, where the code uniquely identifies the player to a host system at the venue. The code is cross-referenced by the host system to any data related to the player, and such data may affect the games offered to the player by the gaming terminal. The card reader 34 may also include an optical reader and printer for reading and printing coded barcodes and other information on a paper ticket. A card may also include credentials that enable the host system to access one or more accounts associated with a user. The account may be debited based on wagers by a user and credited based on a win.

The card reader 34 may be implemented in different ways for various embodiments. The card reader 34 may be an electronic reading device such as a player tracking card reader, a ticket reader, a banknote detector, a coin detector, or any other input device that can read an instrument supplied by the player for conveying a monetary amount. In the case of a tracking card, the card reader 34 detects the player's stored bank and applies that to the gaming machine being played. The card reader 34 or reading device may be an optical reader, a magnetic reader, or other type of reader. The card reader 34 may have a slot provided in the gaming machine for receiving the instrument. The card reader 34 may also have a communication interface (or control or connect to a communication interface) to digitally transfer tokens or indicia of credits or money via various methods such as Radio-Frequency Identification (RFID), tap, smart card, credit card, loyalty card, Near Field Communication (NFC) and so on.

An electronic device may couple (by way of a wired or wireless connection) to the EGM 10 to transfer electronic data signals for player credits and the like. For example, NFC may be used to couple to EGM 10 which may be configured with NFC enabled hardware. This is a non-limiting example of a communication technique.

A keypad 36 may accept player input, such as a Personal Identification Number (PIN) or any other player information. A display 38 above keypad 36 displays a menu for instructions and other information and provides visual feedback of the keys pressed.

The keypad 36 may be an input device such as a touchscreen, or dynamic digital button panel, in accordance with some embodiments.

The EGM 10 may include a plurality of player control buttons 39 that include any buttons or other controllers needed to play the particular game or games offered by EGM 10 including, for example, a bet button, a repeat bet button, a spin reels (or play) button, a maximum bet button, a cash-out button, a display pay lines button, a display payout tables button, select icon buttons, and any other suitable button. The player control buttons 39 may in some embodiments be implemented as virtual buttons on a touch screen display.

The EGM 10 may also include the buttons 39 as part of a digital button panel. The digital button panel may include various elements such as for example, a touch display, animated buttons, frame lights, and so on. The digital button panel may have different states, such as for example, standard play containing bet steps, bonus with feature layouts, point of sale, and so on. The digital button panel may include a slider bar for adjusting the three-dimensional panel. The digital button panel may include buttons for adjusting sounds and effects. The digital button panel may include buttons for betting and selecting bonus games. The digital button panel may include a game status display. The digital button panel may include animation. The buttons of the digital button panel may include a number of different states, such as pres sable but not activated, pressed and active, inactive (not pressable), certain response or information animation, and so on. The digital button panel may receive player interaction commands, in some example embodiments.

The EGM 10 may also include hardware configured to provide eye, motion or gesture tracking. For example, the EGM 10 may include at least one data capture camera device 25, which may be one or more cameras that detect one or more spectra of light, one or more sensors (e.g. optical sensor), or a combination thereof. The data capture camera device 25 may be used for eye, gesture or motion tracking of player, such as detecting eye movement, eye gestures, player positions and movements, and generating signals defining x, y and z coordinates. For example, the data capture camera device 25 may be used to implement tracking recognition techniques to collect player eye gaze data, player eye gesture data, and player movement data. An example type of motion tracking is optical motion tracking. The motion tracking may include a body and head controller. The motion tracking may also include an eye controller. The EGM 10 may implement eye-tracking recognition technology using cameras, sensors (e.g. optical sensor), data receivers and other electronic hardware to capture various forms of player input. The eye gaze, eye gesture, or motion by a player may interact with the interactive game environment or may impact the type of graphical animation effect. Accordingly, the EGM 10 may be configured to capture player eye gaze input, eye gesture input, and movement input as player interaction commands.

Embodiments described herein are implemented by physical computer hardware embodiments. The embodiments described herein provide useful physical machines and particularly configured computer hardware arrangements of computing devices, servers, electronic gaming terminals, processors, memory, networks, for example. The embodiments described herein, for example, is directed to computer apparatuses, and methods implemented by computers through the processing of electronic data signals.

The data capture camera device 25 may capture player data, such as button input, gesture input and so on. The data capture camera device 25 may include a camera, a sensor or other data capture electronic hardware. In some embodiments, EGM 10 may include at least one data capture camera device that continuously monitors the eye gaze of a player to collect player eye gaze data. The player may provide input to the EGM 10 using the eye gaze of the player. For example, using the eye gaze of the player, which may be collected as player eye gaze data, the player may select an interactive game to play, interact with a game component, or trigger a bonus interactive game.

Embodiments described herein involve computing devices, servers, electronic gaming terminals, receivers, transmitters, processors, memory, display, and networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

As described herein, the EGM 10 may be configured to provide an interactive game environment that concurrently displays a game to a player. The interactive game environment may be a 2D or 3D interactive game environment. The interactive game environment may provide a plurality of game components or game symbols based on the game data. The game data may relate to a primary interactive game or a bonus interactive game, or both. For example, the interactive game environment may include a 3D reel space that may have an active primary game matrix of a primary subset of game components. The bonus subset of game components may be different from the primary subset of game components. The player may view a viewing area of the interactive game environment, which may be a subset of the interactive game environment, on the display device 12, 14. The interactive game environment or the viewing area may be dynamically updated based on the eye gaze, eye gesture, or movement of the player in real-time or near real-time. The update to the interactive game environment or the viewing area may be a graphical animation effect displayed on the display device 12, 14. The update to the interactive game environment or the viewing area may be triggered based on the eye gaze, eye gesture, or movement of the player. For example, the update may be triggered by looking at a particular part of the viewing area for a pre-determined period of time, or looking at different parts of the viewing area in a pre-determined sequence, or widening or narrowing the eyes. The interactive game environment may be updated dynamically and revealed by dynamic triggers from game content of the primary interactive game in response to electronic data signals collected and processed by EGM 10.

For an interactive game environment, the EGM 10 may include a display device 12, 14 with auto stereoscopic 3D functionality. The EGM 10 may include a touch screen display for receiving touch input data to define player interaction commands. The EGM 10 may also include at least one data capture camera device, for example, to further receive player input to define player interaction commands. The EGM 10 may also include several effects and frame lights. The 3D enhancements may be an interactive game environment for additional game symbols.

The EGM 10 may include an output device such as one or more speakers. The speakers may be located in various locations on the EGM 10 such as in a lower portion or upper portion. The EGM 10 may have a chair or seat portion and the speakers may be included in the seat portion to create a surround sound effect for the player. The seat portion may allow for easy upper body and head movement during play. Functions may be controllable via an on screen game menu. The EGM 10 is configurable to provide full control over all built-in functionality (lights, frame lights, sounds, and so on).

The EGM 10 may also include a plurality of effects lights and frame lights. The lights may be synchronized with enhancements of the game. The EGM 10 may be configured to control color and brightness of lights. Additional custom animations (color cycle, blinking, etc.) may also be configured by EGM 10. The custom animations may be triggered by certain gaming events.

In some embodiments, an EGM 10 may be implemented by a desktop computer, a laptop personal computer, a personal digital assistant (PDA), portable computing device, or other computerized platform. In some embodiments, the EGM 10 may be operable over a wireless network, such as part of a wireless gaming system. In such embodiments, the gaming machine may be a handheld device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 1C:
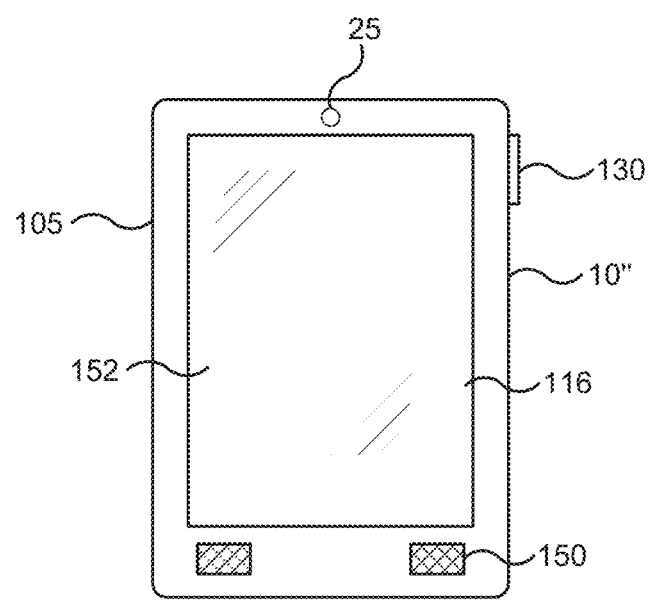
FIG. 1C is a perspective view of a handheld electronic gaming machine according to further embodiments.

For example, referring to FIG. 1C, an EGM 10" may be implemented as a handheld device including a compact housing 105 on which is mounted a touchscreen display device 116 including a digitizer 152. An input button 130 may be provided on the housing and may act as a power or control button. A camera device 25 may be provided in a front face of the housing 105. The housing 105 may include one or more speakers 150. In the EGM 10", various input buttons described above, such as the cashout button, gameplay activation button, etc., may be implemented as soft buttons on the touchscreen display device 116. Moreover, the EGM 10" may omit certain features, such as a bill acceptor, a ticket generator, a coin acceptor or dispenser, a card reader, secondary displays, a bet display, a credit display, etc. Credits can be deposited in or transferred from the EGM 10" electronically.

Figure 2:
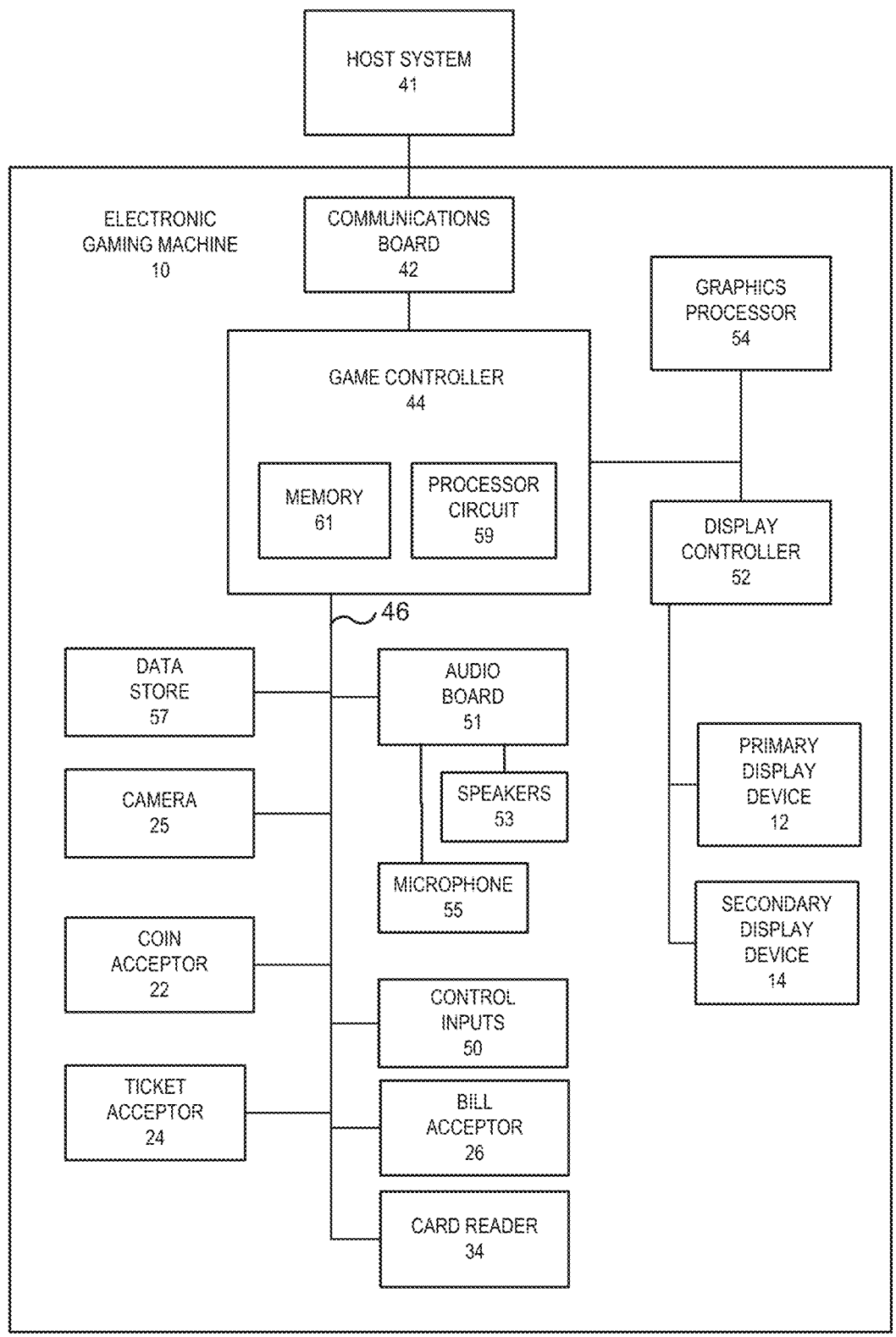
FIG. 2 is a schematic diagram of an electronic gaming machine linked to a casino host system according to some embodiments.

FIG. 2 is a block diagram of some components of EGM 10 according to some embodiments. The EGM 10 is shown linked to the casino's host system 41 via network infrastructure. These hardware components are particularly configured to provide at least one interactive game. These hardware components may be configured to provide at least one interactive game and at least one bonus game, and in some cases to provide a plurality of concurrently displayed interactive games.

A communications board 42 may contain circuitry for coupling the EGM 10 to network. The communications board 42 may include a network interface allowing EGM 10 to communicate with other components, to access and connect to network resources, to serve an application, to access other applications, and to perform other computing applications by connecting to a network (or multiple networks) capable of carrying data including the Internet, Ethernet, Plain Old Telephone Service (POTS) line, Public Switch Telephone Network (PSTN), Integrated Services Digital Network (ISDN), Digital Subscriber Line (DSL), coaxial cable, fiber optics, satellite, mobile, wireless (e.g. WMAX), SS7 signaling network, fixed line, local area network, wide area network, and others, including any combination of these. The EGM 10 may communicate over a network using a suitable protocol, such as the G2S protocols.

The communications board 42 may communicate, transmit and receive data using a wireless transmitter, or it may be wired to a network, such as a local area network running throughout the casino floor, for example. The communications board 42 may set up a communication link with a master controller and may buffer data between the network and a game controller 44. The communications board 42 may also communicate with a network server, such as in accordance with the G2S standard, for exchanging information to carry out embodiments described herein.

The game controller 44 includes a memory 61 and a processor circuit 59 for carrying out program instructions stored in the memory and for providing the information requested by the network. Game data for one or more game programs may be stored in the memory 61. The processor circuit 59 may be a multi-core processor including two or more independent processing units. Each of the cores in the processor circuit 59 may support multi-threading operations, i.e., may have the capability to execute multiple processes or threads concurrently. Additionally, the processor circuit 59 may have an on-board memory cache. An example of a suitable multi-core, multithreaded processor circuit is an Intel® Core i7-7920HQ processor, which has four cores that support eight threads each and has an 8-megabyte on-board cache. The game controller 44 executes game routines using game data stores in a data store 57 accessible to the game controller 44, and cooperates with a graphics processor 54 and a display controller 52 to provide games with enhanced interactive game components. The graphics processor 54 may have an integrated high-speed dedicated graphics memory.

The EGM 10 may include at least one data capture camera device 25 for implementing the gaming enhancements, in accordance with some embodiments. The EGM 10 may include the data capture camera device 25, one or more sensors (e.g. optical sensor), or other hardware device configured to capture and collect in real-time or near real-time data relating to the eye gaze, eye gesture, or movement of the player(s), or any combination thereof.

In some embodiments, the data capture camera device 25 may be used for eye gaze tracking, eye gesture tracking, motion tracking, and movement recognition. The data capture camera device 25 may collect data defining x, y and z coordinates representing eye gaze, eye gestures, and movement of the player(s).

In some embodiments, the data capture camera device 25 may track a position of each eye of a player relative to display device 12, 14, as well as a direction of focus of the eyes and a point of focus on the display device 12, 14, in real-time or near real-time. The focus direction may be the direction at which the player's line of sight travels or extends from his or her eyes to display device 12, 14. The focus point may be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises. All of the above mentioned eye tracking or movement data, as well as the focus direction and focus point, may be examples of, and referred to as, player's eye movements or player movement data.

In some embodiments, the data capture camera device 25 may monitor the eye gaze, eye gesture, and/or movement of two or more people, who may be two or more players of the interactive game, to collect the player eye gaze data, player eye gesture data, and/or player movement data. The player eye gaze data, player eye gesture data, and/or player movement data may be used such that both players may be able to play the interactive game simultaneously. The interactive game may include aspects of both cooperative and competitive play.

As previously described, the data capture camera device 25 may track a position of a player's eyes relative to display device 12, 14, as well as a focus direction and a focus point on the display device 12, 14 of the player's eyes in real-time or near real-time. The focus direction can be the direction at which the player's line of sight travels or extends from his or her eyes to the display device 12, 14. The focus point may sometimes be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises. All of the above mentioned eye tracking or movement data, as well as the focus direction and focus point, may be instances of player movement data.

In addition, a focus point may extend to or encompass different visual fields visible to the player. For example, a foveal area may be a small area surrounding a fixation point on the display device 12, 14 directly connected by a (virtual) line of sight extending from the eyes of a player. This foveal area in the player's vision may generally appear to be in sharp focus and may include one or more game components and the surrounding area. A focus point may include the foveal area immediately adjacent to the fixation point directly connected by the (virtual) line of sight extending from the player's eyes.

The display controller 52 may control one or more of display device 12, 14 the using graphics processor 54 to display a viewing area that may include one or more visible game components based on the game data of a plurality of concurrently displayed interactive games.

The display controller 52 may, in response to detection of the control command from the game controller 44 based on the player eye gaze data, player eye gesture data, or player movement data, control display device 12, 14 using graphics processor 54. Display controller 52 may update the viewing area to trigger a graphical animation effect displayed on one or both of display device 12, 14 representative of a visual update to the visible game components in the viewing area, the visual update based on the player eye gaze data, player eye gesture data, or player movement data.

Peripheral devices/boards in the EGM 10 may communicate with the game controller 44 via a bus 46 using, for example, an RS-232 interface. Such peripherals may include a bill acceptor 26, a coin acceptor 22, a ticket acceptor 24, a smart card reader or other type of card reader 34, and player control inputs 50 (such as buttons or a touch screen).

The player control inputs 50 may include the keypad, the buttons, touchscreen display, gesture tracking hardware, and data capture device as described herein. Other peripherals may be one or more cameras used for collecting player input data, or other player movement or gesture data that may be used to trigger player interaction commands. The display device 12, 14 may be a touch sensitive display device. Player control input 50 may be integrated with the display device 12, 14 to detect player interaction input at the display device 12, 14.

The game controller 44 may also control one or more devices that produce the game output including audio and video output associated with a particular game that is presented to the user. For example, an audio board 51 may convert coded signals into analog signals for driving speakers 53. Some embodiments provide that an audio board may convert audio signals, either analog or digital, that are received via a microphone 55, into coded signals.

The game controller 44 may be coupled to an electronic data store storing game data for one or more interactive games. The game data may be for a primary interactive game and/or a bonus interactive game. The game data may, for example, include a set of game instructions for each of the one or more interactive games. The electronic data store may reside in a data storage device, e.g., a hard disk drive, a solid state drive, or the like. Such a data storage device may be included in EGM 10, or may reside at the host system 41. In some embodiments, the electronic data store storing game data may reside in the cloud.

The card reader 34 reads cards for player and credit information for cashless gaming. The card reader 34 may read a magnetic code on a conventional player tracking card, where the code uniquely identifies the player to a host system at the venue. The code is cross-referenced by the host system 41 to any data related to the player, and such data may affect the games offered to the player by the gaming terminal. The card reader 34 may also include an optical reader and printer for reading and printing coded barcodes and other information on a paper ticket. A card may also include credentials that enable the host system 41 to access one or more accounts associated with a user. The account may be debited based on wagers by a user and credited based on a win.

The graphics processor 54 may be configured to generate and render animation game enhancements based on game data as directed by the game controller 44. The game enhancements may involve an interactive game environment that may provide one or more game components and graphical animation effects. The graphics processor 54 may be a specialized electronic circuit designed for image processing (including 2D and 3D image processing in some examples) in order to manipulate and transform data stored in memory to accelerate the creation of images in a frame buffer for output to the display by way of the display controller 52. The graphics processor 54 may redraw various game enhancements as they dynamically update. The graphics processor 54 may cooperate with game controller 44 and display controller 52 to generate and render enhancements as described herein. The graphics processor 54 may generate an interactive game environment that may provide one or more game components, for example, a 3D reel space of a plurality of game components. The graphics processor 54 may generate graphical animation effects to represent a visual update to the game components in the viewing area, the visual update based on the player eye gaze data, player eye gesture data, player movement data, or any combination thereof.

The display controller 52 may employ a high data transfer rate and may convert coded signals to pixel signals for the display. The display controller 52 and the audio board 51 may be directly connected to parallel ports on the game controller 44. The electronics on the various boards may be combined onto a single board. The display controller 52 may control output to one or more display device 12, 14 (e.g. an electronic touch sensitive display device). The display controller 52 may cooperate with graphics processor 54 to render animation enhancements on the display device 12, 14.

The display controller 52 may be configured to interact with graphics processor 54 to control the display device 12, 14 to display a viewing area defining the interactive game environment including navigation to different views of the interactive game environment. Player control inputs 50 and the data capture camera device 25 may continuously detect player interaction commands to interact with interactive game environment. For example, the player may move a game component to a preferred position, select a game component, or manipulate the display of the game components.

In some embodiments, the display controller 52 may control the display device 12, 14 using the graphics processor 54 to display the viewing area that may have one or more game components. In response to the detection of the control command based on the player eye gaze data, player eye gesture data, player movement data, or any combination thereof, the display controller 52 may trigger a graphical animation effect to represent a visual update to the game components in the viewing area.

Figure 3:
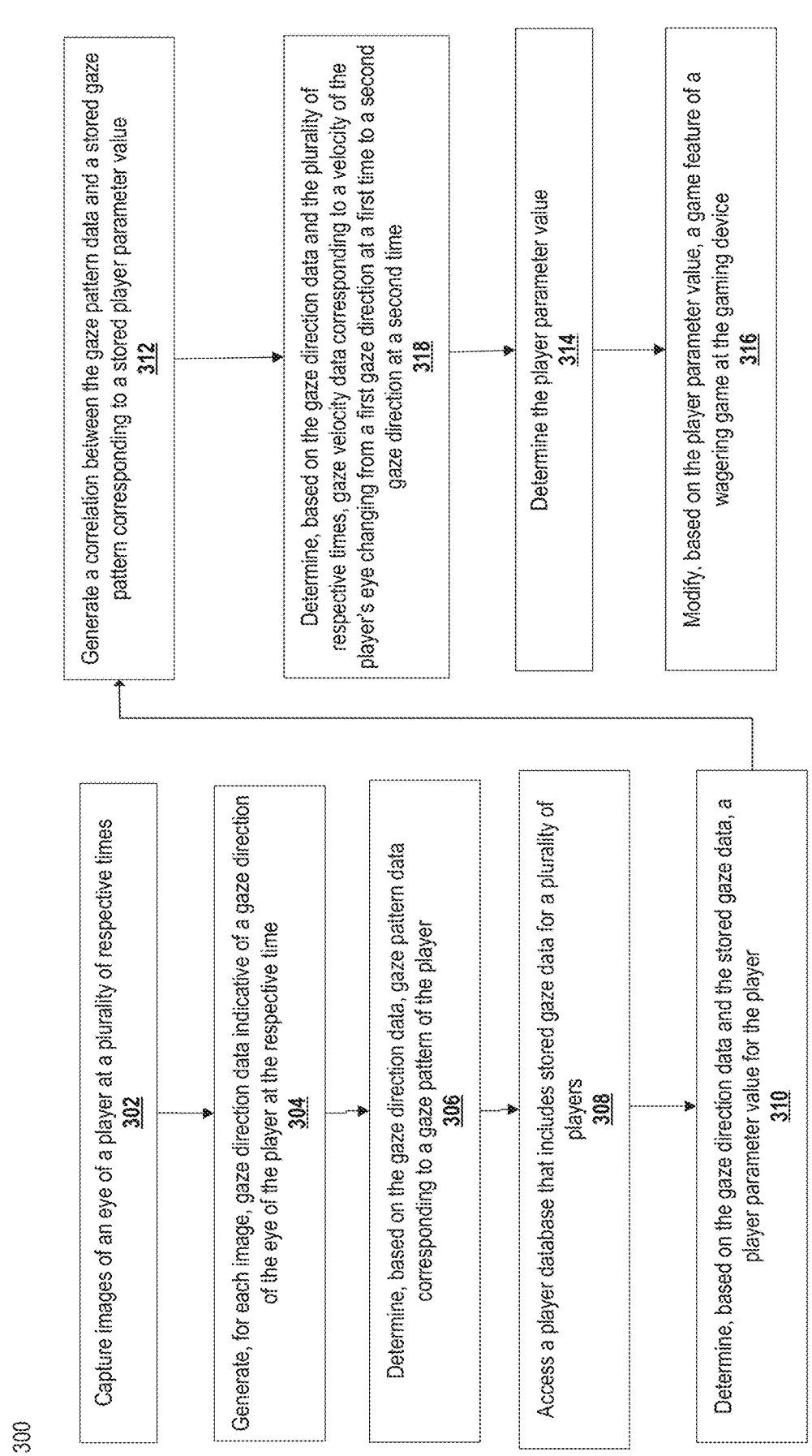
FIG. 3 is a flowchart diagram of a method implemented by an electronic gaming machine according to some embodiments.

Referring now to FIG. 3, a schematic block diagram illustrates operations 300 for using gaze direction data to determine a player parameter value according to some embodiments. The operations 300 include capturing a plurality of images of an eye of a player of a gaming device at a plurality of respective times (block 302).

The operations 300 further include generating, for each image, gaze direction data indicative of a gaze direction of the eye of the player at the respective time (block 304). The operations 300 may also include determining, based on the gaze direction data, gaze pattern data corresponding to a gaze pattern of the player (block 306). In some examples, the gaze pattern data corresponds to a pattern of user interface elements being displayed by the display device. The operations 300 further include accessing a player database that includes stored gaze data for a plurality of players, and/or other player data (block 308).

The operations 300 further include, determining, based on the gaze direction data and the stored gaze data, a player parameter value corresponding to a player parameter for the player (block 310). This operation may further include generating a correlation between the gaze pattern data and a stored gaze pattern of the stored gaze data corresponding to a stored player parameter value (block 312), and determining the player parameter value based on the correlation (block 314). The operations 300 further include modifying, based on the player parameter value, a game feature of a wagering game at the gaming device (block 316). Modifying the game feature may include enabling the game feature of the gaming device for use by the player.

In some embodiments, the operations 300 may further include determining, based on the gaze direction data and the plurality of respective times, gaze velocity data corresponding to a velocity of the eye of the player changing from a first gaze direction at a first time to a second gaze direction at a second time (block 318). In this embodiment, determining the player parameter value may be further based on the gaze velocity data. Additional aspects of these and other operations will be described below with respect to FIGS. 4-6.

Figure 4:
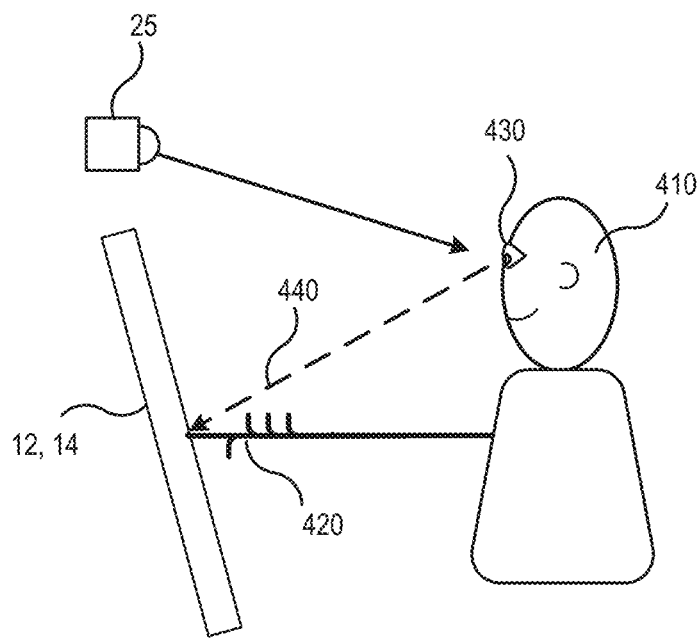
FIG. 4 is a schematic diagram illustrating the mapping of a player's eye gaze to the viewing area and receiving a secondary input according to some embodiments.

Gaze direction data may be obtained in a number of ways. In this regard, FIG. 4 is a schematic diagram illustrating the mapping of a player's eye gaze to the viewing area according to some embodiments. In this example, the game controller (such as the game controller 44 of FIG. 3) may determine the location of the eye gaze relative to the viewing area based on the position of the player's eyes 430 relative to the EGM 10 and an angle of the player's eyes 430. As shown in FIG. 4, the data capture camera device 25 may monitor the position of the player's eyes 430 relative to EGM 10, and may also monitor the angle of the player's eyes 430 to collect display mapping data. The angle of the player's eyes 430 may define the focus of the eye gaze, which may be a line of sight relative to the display device 12, 14. Based on the display mapping data, which may include the position of the player's eyes relative to the EGM 10 and an angle of the player's eyes 430 or the line of sight relative, the game controller 44 may be configured to determine the direction and length of a virtual arrow 440 projecting from the player's eyes 430. The virtual arrow 440 may represent the eye gaze of the player 410. The game controller 44 may determine where the virtual arrow 440 intersects with the display device 12, 14. The intersection of the virtual arrow 440 and display device 12, 14 may represent where the eye gaze of the player 410 is focused on the display device 12, 14. The display device 12, 14 may be controlled by display controller 52 to display the viewing area. The game controller 44 may identify coordinates on the display device 12, 14 corresponding to the player eye gaze data and may map the coordinates to the viewing area to determine the eye gaze of the player relative to the viewing area. The mapping of the coordinates may be included in data that may be referred to as gaze detection data. The EGM 10 may determine the location of the viewing area that the player 410 is looking at, which may be useful for the EGM 10 to determine how the player 410 is interacting with the interactive game. In some embodiments, the eye gaze of the player may be expressed in 2D or 3D and may be mapped to a 2D or 3D viewing area, depending on whether the interactive game is a 2D interactive game or a 3D interactive game.

In some examples, the EGM 10 may also receive a physical touch input from the player 410 via a player's hand/finger 420. For example, a player 410 may provide an input to the EGM 10 by touching a touchscreen display and/or by touching another button. As illustrated, the player 410 may provide a physical touch as a secondary input to the EGM by touching a button with his hand 420. In such embodiments, evaluating the gaze direction data and the data corresponding to the physical touch, may include comparing the gaze direction data of the player to the given location of the user interface portion that defines the button to determine an accuracy of the gaze direction data or the physical touch.

Accuracy of the gaze direction data may be beneficial in providing data corresponding to the calibration of the gaze detection system. For example, one challenge with the gaze detection technology is calibrating the hardware and software for the current user. Even when that is achieved, the calibration may vary over time for various reasons. One reason may be that the player moves around in his or her seat over time. Another reason may be that the player becomes tired and changes posture and/or body position over time. It may be advantageous to have regular calibration data to provide an optimum player experience.

When the player intentionally touches an element on a screen, such as a button, the player may be assumed to look at the button before touching it as a player generally may not press a button to change the denomination, or double up without first looking at the button. The game software can take advantage of this fact and note the gaze locations of the player just prior to the pressing of an on screen game element. In such embodiments, the gaze direction data may include gaze direction data that was generated and/or received during a time interval that occurs before the physical touch is received. In some embodiments, the gaze direction data may be stored in a moving time interval window that may be available for comparison responsive to receiving the physical touch input.

If the location that is mapped to the gaze direction data just before the physical touch matches a given location of the button that receives the touch, then the accuracy of the gaze detection system may be considered to be acceptable. In the alternative, if the location that is mapped to the gaze direction data does not match the given location of the button that receives the touch then the gaze detection system may have some inaccuracies.

Figure 5:
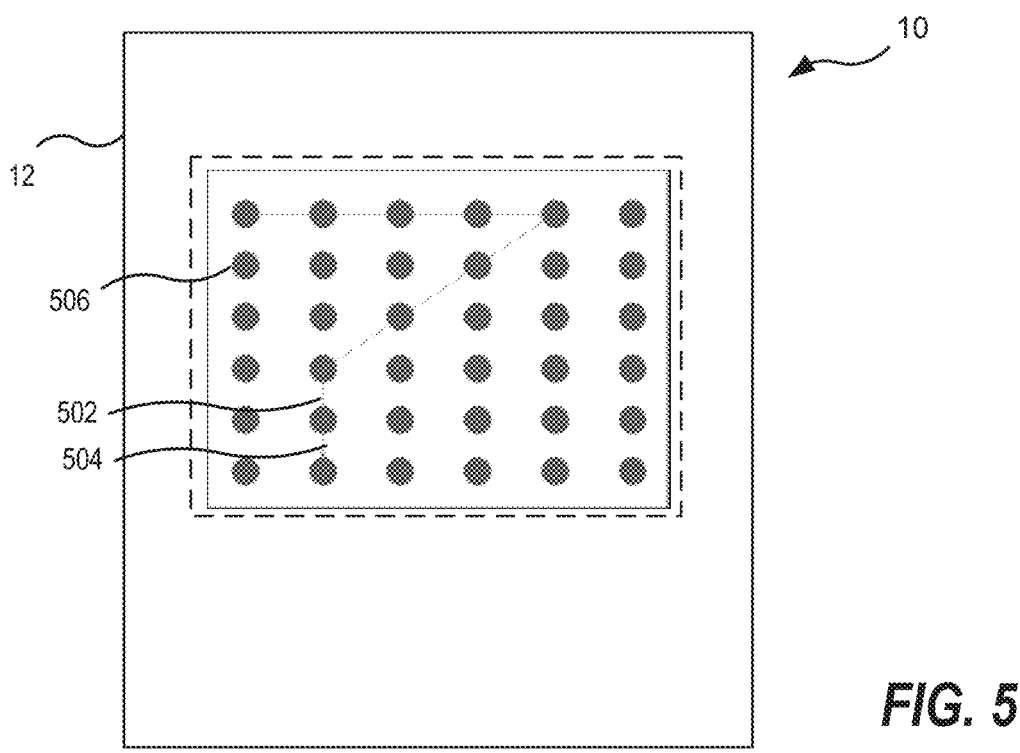
FIG. 5 is a schematic block diagram illustrating a display screen having a pattern of user interface elements corresponding to a gaze pattern, according to some embodiments.

Some embodiments may include comparing gaze direction data with stored gaze data to evaluate different player parameters for a player at the EGM or other gaming device. For example, as shown in FIG. 5, the EGM 10 may determine gaze pattern data corresponding to a gaze pattern 502 of the player based on the gaze direction data over a period of time. For example, the gaze pattern 502 may EGM 10 may correspond to a pattern 504 of user interface elements 506 being displayed by the display device 12 of the EGM 10. In this example, the EGM 10 generates a correlation between the gaze pattern data and a stored gaze pattern of stored gaze data corresponding to a stored player parameter value, and determines the player parameter value, such as identify verification of the player for example, based on the correlation.

In some embodiments, the player data may also include a plurality of unique identifiers for the plurality of players, and the player parameter value may include a unique identifier of the plurality of unique identifiers corresponding to an identity of the player. For example, the gaze pattern data may to a plurality of symbols being displayed by the display device, with the gaze pattern data including a first pattern. The player data may include a second pattern corresponding to the player. Determining the identity of the player may further include generating a correlation between the first pattern and the second pattern, and determining the unique identifier further based on the correlation. For example, the first pattern may correspond to a plurality of game elements of the wagering game being displayed by the display device, and the second pattern may include a winning pattern associated with a winning game result of the wagering game. In this example, the operations may further include determining that a winning result has occurred, awarding a benefit associated with the winning result to the player.

Figure 6:
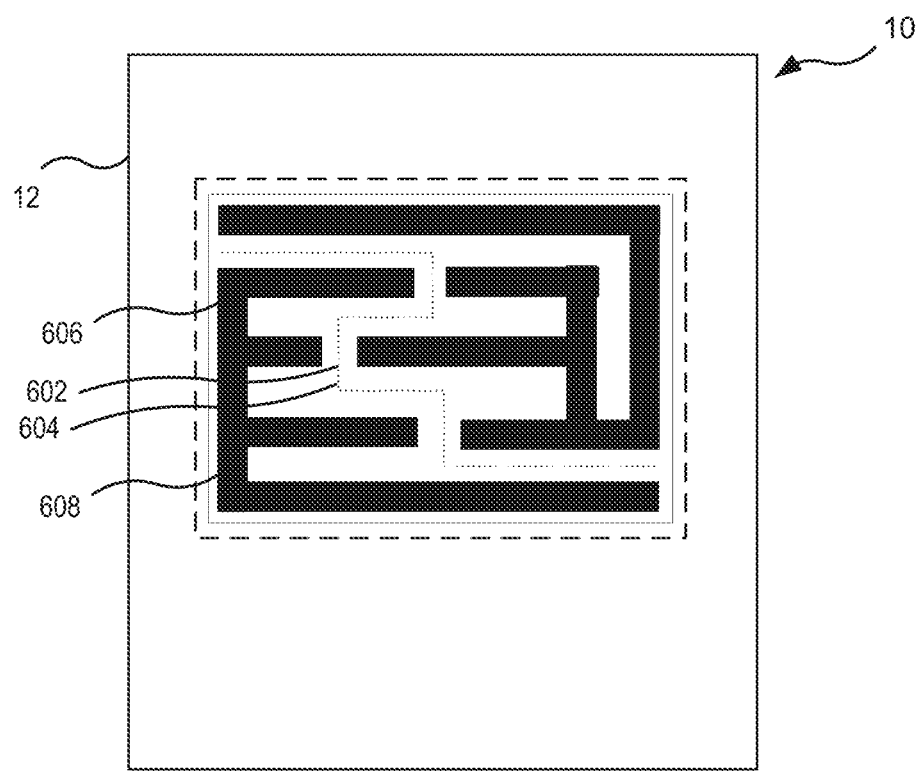
FIG. 6 is a schematic block diagram illustrating a display screen having a plurality of user interface elements corresponding to a maze game, according to some embodiments.

For example, FIG. 6 is a schematic block diagram illustrating a display device 12 for an EGM 10 having a plurality of user interface elements 606 corresponding to a maze game, according to some embodiments. In this example, a gaze pattern 602 may EGM 10 may correspond to a path 604 through a graphical maze 608 being displayed by the display device 12 of the EGM 10. In this example, the EGM 10 generates a correlation between the gaze pattern data and the maze path 604. Based on the player successfully navigating the maze path 604, the EGM 10 may generate and/or provide an award to the player.

Figure 7:
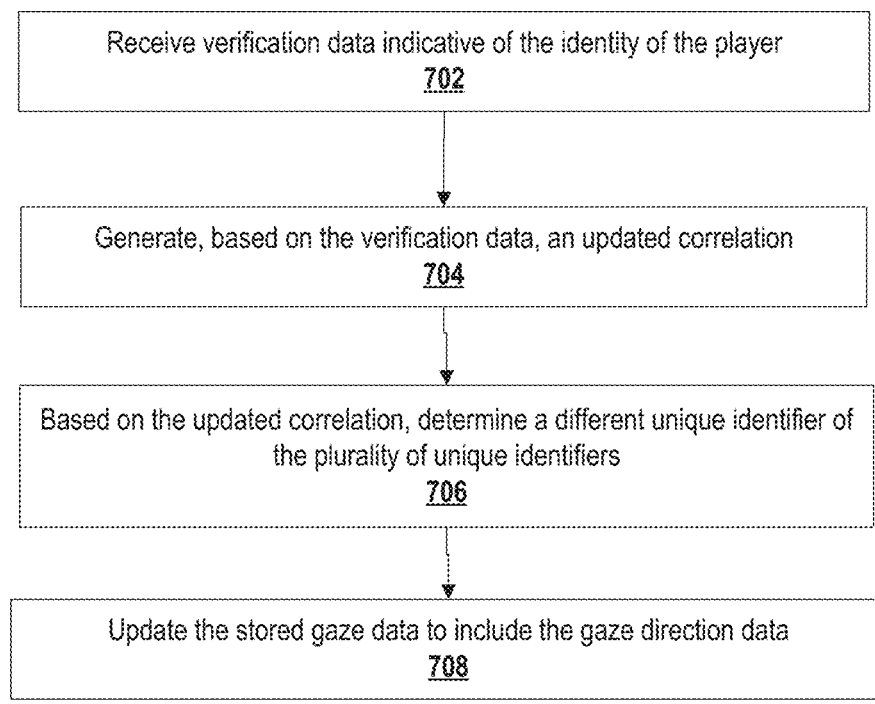
FIG. 7 is a schematic block diagram illustrating operations for using gaze direction data to update stored gaze data based on verification data according to some embodiments.

In some examples, the stored gaze data may be updated over time as additional data is received. In this regard, FIG. 7 is a schematic block diagram illustrating operations 700 for using gaze direction data to update stored gaze data based on verification data according to some embodiments. The operations 700 include receiving verification data indicative of the identity of the player (block 702). In some examples, this operation may occur in response to identifying the player based on the correlation between the gaze direction data and the stored gaze data, discussed above with respect to FIG. 3, for example. The operations 700 may further include generating, based on the verification data, an updated correlation (block 704), e.g., between the first pattern and the second pattern for example. The operations 700 may further include determining, based on the updated correlation, a different unique identifier of the plurality of unique identifiers (block 706), e.g., providing an updated identification for the player in response to receiving verification data that indicates that the initial identification was inaccurate. Alternatively or in addition, in some examples, the operations 700 may further include updating the stored gaze data associated with the player to include the gaze direction data (block 708), e.g., incorporating the gaze direction data into the stored gaze data in response to receiving verification data that indicates that the initial identification was accurate.

In some embodiments, gaze direction data may be correlated with game play data. In this regard, FIG. 8 is a schematic block diagram illustrating additional operations 800 using gaze direction data correlated with game play data as part of determining player parameter values (e.g., block 314 of FIG. 3 above), according to some embodiments. In this embodiment, the operations 800 include determining current gameplay data based on play of a wagering game by the player at the gaming device (block 802). The operations 800 may further include generating a correlation between the current gameplay data and stored gameplay from stored gameplay data indicative of historical play of a wagering game (block 804). In this example, the stored gameplay data is part of the player data. The operations 800 further include determining a player parameter value based on the correlation (block 806).

In some examples, the player data may include for each player, stored attention level data indicative of an attention level of the player corresponding to the stored gaze data. In this example, determining the player parameter value of the player further includes generating a correlation between the gaze direction data and the stored attention level data, and determining the player parameter value based on the correlation, wherein the player parameter value further includes an attention level value corresponding to a current attention level of the player. A game feature may then be modified based on the player parameter value. For example, modifying the game feature may include determining that the attention level value meets a predetermined attention level threshold. Based on the attention level value meeting the predetermined attention level threshold, the game feature of the EGM or other gaming device may be enabled for use by the player. Alternatively or in addition, modifying the game feature may include determining that the attention level value fails to meet a predetermined attention level threshold, and, based on the attention level value failing to meet the predetermined attention level threshold, disabling the game feature of the gaming device for use by the player.

In another example, the player data may include, for each player, stored emotional state data indicative of an emotional state of the player corresponding to the stored gaze data. In this embodiment, determining the player parameter value of the player may include generating a correlation between the gaze direction data and the stored emotional state data, and determining the player parameter value based on the correlation, wherein the player parameter value further includes an emotional state value corresponding to a current emotional state of the player.

Figure 9:
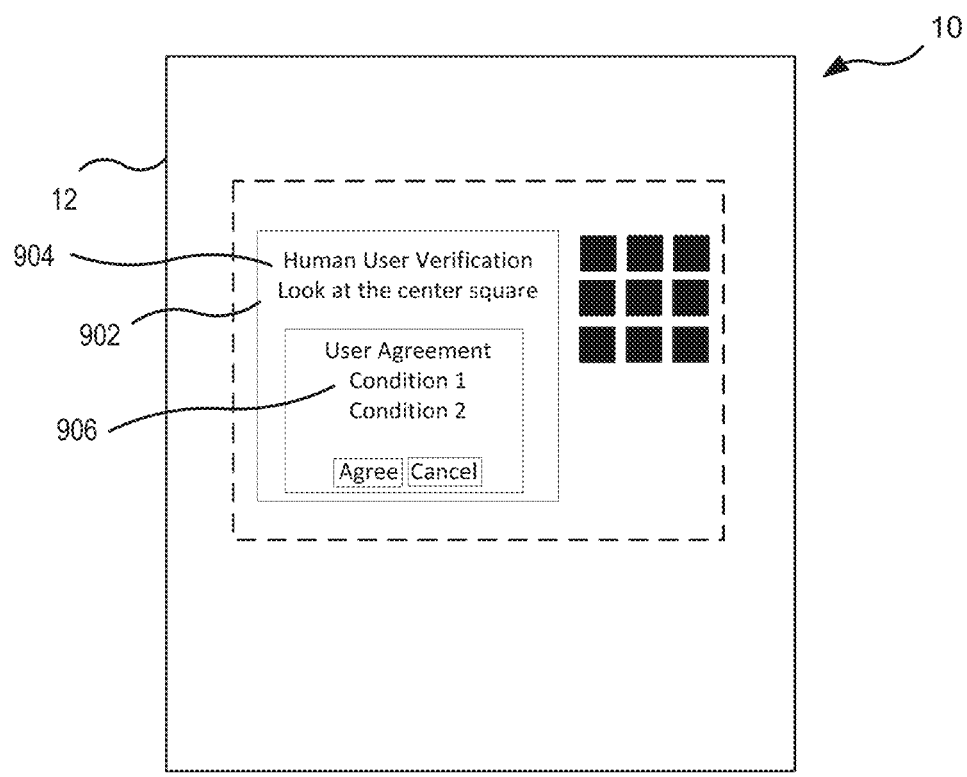
FIG. 9 is a schematic block diagram illustrating a display screen displaying a verification message, according to some embodiments.

In another example, operations may further include determining, based on the gaze direction data and the player data, player is a human player. In response to determining that the player is a human player, one or more game features of the wagering game may be enabled. In this regard, FIG. 9 is a schematic block diagram illustrating a display device 12 for an EGM 10 displaying a verification message 902, according to some embodiments. In this example, the verification message 902 is displayed on the display device 12 or other display device, and gaze direction data is used to determine that the player has read the message 902. The message may be a captcha-style verification message 904, a plain-language passage (e.g., end-user agreement 906, for example), or another message. In response to determining that the player has read the message and/or that the player is a human player (i.e., not a "bot"), the game feature of the wagering game may be enabled.

While playing an interactive game on the EGM 10, the eyes of a player may move suddenly without the player being conscious of the movement. The eyes of the player may demonstrate subconscious, quick, and short movements, even if the player is not actively controlling their eyes to move in this manner. These subconscious, quick, and short eye movements may affect the game controller's determination of the eye gaze of the player based on the player eye gaze data. Accurate processing of the player eye gaze data related to these subconscious, quick, and short eye movements may result in detecting the location of the eye gaze of the player representative of eye twitching or erratic eye movements not reflective of the player's intended eye gaze, and may be distracting to the player. It may be useful for the player eye gaze data to be filtered to not reflect these quick and short eye movements, for example, so the determination of the eye gaze of the player relative to the viewing area by the game controller reflects the intended eye gaze of the player. It may also be useful for the portion of the player eye gaze data representative of the subconscious, quick, and short eye movements to have less determinative effect on the determined location of the eye gaze of the player. In some embodiments, the game controller 44 may define a filter movement threshold, wherein the game controller, prior to determining a location of the eye gaze of the player relative to the viewing area using the player eye gaze data collected by the data capture camera device 25 and updating the rendering of the viewing area, determines that the player eye gaze meets the filter movement threshold. The data capture camera device 25 may collect player eye gaze data.

The game controller 44 may process the player eye gaze data to correspond with a location on the viewing area. The game controller 44 may determine where the player is looking at on the viewing area based on a certain number of previously recorded player eye gaze data, for example, by tracking the last ten eye gaze positions to average out where on the viewing area the player is looking. The game controller 44 may limit the amount of previously recorded player eye gaze data that is used to determine where on the viewing area the player is looking. The game controller 44 may filter out, or "smooth out", player eye gaze data outside of the pre-determined filter movement threshold, which may represent sudden and subconscious eye movement. The game controller 44 may map the eye gaze of the player to the viewing area using at least a portion of the filtered player eye gaze data to determine the location of the viewing area at which the player is looking, in order to map the player's eye gaze to the viewing area.

As another example, the game controller 44 may delay in processing the player eye gaze data associated with subconscious, quick, and short eye movements, so the detected location of the eye gaze of the player does not represent twitching or sudden unconscious eye movements which may trigger animation effects causing an unpleasant user experience. Large eye motions may also be associated with more delay in processing and more smoothing. In some embodiments, the game controller may partition the player eye gaze data associated with large eye motions into data representative of shorter eye motions. The game controller 44 may analyze the player eye gaze data to determine which data is associated with subconscious eye movement or with conscious eye movement based on a filter movement threshold, a time threshold, movement threshold, or any combination thereof. Player eye gaze data associated with quick eye movements over a certain period of time may be determined by the game controller 44 to be subconscious eye movement. The game controller 44 may delay in processing this portion of data so the detected location of the eye gaze of the player may be stable and may not distract the player, or the game controller may filter out this data and not process it. Player eye gaze data associated with large eye movements over a certain period of time may be determined by the game controller to be the player losing focus or being distracted. The game controller 44 may similarly delay in processing this portion of data or not process this portion of data. In some embodiments, game controller 44 may filter out, or "smooth out" player eye gaze data, player eye gesture data, player movement data, or a combination thereof, that may exceed the filter movement threshold, in the manner described herein.

The locations where the EGM 10 may be used may have a variety of lighting conditions. For example, the EGM 10 may be used in a restaurant, a hotel lobby, an airport, and a casino. It may be brighter in some locations and darker in other locations, or the light quality may fluctuate from brightness to darkness. In some embodiments, EGM 10 may include an infrared light source that illuminates the player. The infrared light sources may not interfere with the eyes of the player. In some embodiments, the data capture camera device 25 may be an infrared data capture camera device. The infrared data capture camera device may collect player eye gaze data, player eye gesture data, and player movement data without being affected by the lighting conditions of the locations where EGM 10 may be used. In some embodiments, the EGM 10 may have a plurality of light sources providing a plurality of spectra of light, and the data capture camera device 25 may be a plurality of data capture camera devices configured to detect a plurality of spectra of light, so the data capture camera device 25 may collect player eye gaze data, player eye gesture data, and player movement data without being affected by the lighting conditions of the locations where EGM 10 may be used.

A player that plays an interactive game using EGM 10 may be wearing glasses. The glasses of the player may cause refractions of the light that illuminates the player. This may affect the data capture camera device 25 while it monitors the eye gaze, eye gesture, and/or movement of the player.

Glasses that include an infrared filter may also interfere with or affect the data capture camera device 25 while it monitors the eye gaze, eye gesture, and/or movement of the player. The EGM 10 may recognize that the player may be wearing glasses. For example, as the interactive game commences, display controller 52 may display on display device 12, 14 using graphics processor 54 a question asking the player if he or she is wearing glasses. The player may provide input indicating whether he or she is wearing glasses, such as, but not limited to, with an audio command, touch command, or with the player's eye gaze. As other example, the game controller 44 may recognize, based on processing the player eye gaze data from the data capture camera device 25, that the light illuminating the player may be refracted, and may determine that the player is wearing glasses. When EGM 10 recognizes that the player may be wearing glasses, the game controller 44 may perform additional and/or more stringent filtering functions as described herein to compromise for the player's use of glasses and to accommodate the refractions of the light that illuminates the player. For example, the filter movement threshold may be set to be higher for players who wear glasses.

In some embodiments, the game controller 44 may be configured to predict the location of the eye gaze of the player relative to the viewing area at a future time using the player eye gaze data to facilitate dynamic update to the rendering of the viewing area. For example, if the game controller 44 determines that a player is changing their gaze on a horizontal plane from the left to the right, the game controller 44 may predict that the player may look at a game component displayed on the right side of display device 12, 14. The ability for game controller 44 to predict the location of the eye gaze of the player at a future time may be useful to rule out inaccurate readings. For example, while a player plays a game, the data capture camera device 25 may incorrectly detect a button on the clothing of a player to be the player's eyes, and may collect incorrect player eye gaze data based on the button. Based on the location of the eye gaze predicted by game controller 44, the incorrect player eye gaze data may be ruled out by game controller 44, and may not be processed by game controller 44 to trigger a control command to update the viewing area with a graphical animation effect. As another example, by predicting the location of the eye gaze, the display controller 52 may adjust the resolution of the display device 12, 14 where the player is not expected to be looking.

In some embodiments, the EGM 10 may apply one or more predictive techniques to develop a plurality of predicted points of eye gaze, which, for example, may approximate and/or estimate where a player's gaze will travel next. These predictions may also be provided for use by graphics processor 54 and/or game controller 44 in relation with smoothing out and/or accounting for removal of transient readings, undesirable artefacts and/or inadvertent gaze positions. In some embodiments, the predictions may also be used to improve the performance of EGM 10 in relation to gaze capture and/or processing thereof, by, for example, applying heuristic techniques to reduce the number of computations and/or capture frequency by relying on predictions to interpolate and/or extrapolate between gaze positions captured.

For example, when a player looks at a location of a viewing area in an interactive game, the EGM 10 may record where they were looking and what events are being displayed to the player (e.g., as first movements and/or gaze positions). When an event is triggered a second time, the player's gaze movements are recorded into a data storage system, but then compared to the first movements. A comparison may include, for example, comparing positions, velocities, start and end positions, accelerations, etc. as between various gaze movements.

For example, for each duration, a path and end location may be calculated, and a predicted pathway may be developed based on these locations and stored in a data storage.

As the event is triggered more times (e.g., more iterations occur), the data may be accumulated and a predictive pathing model can be built. Once the predictive pathing model is developed, when the event is triggered, the EGM 10 could reduce the frequency of the gaze system updates and use the recorded pathing and final location to be used to reduce the overall computing resource requirements, for example (e.g., performing various functions of interpolation, extrapolation using the predictive pathing model).

Accordingly, predictive pathing can also be used to reduce errors being produced by the gaze system. Gaze systems may utilize cameras and edge detection to determine where the player is looking, and many utilize use infra-red light to see the player's eye. If there are other infra-red light sources, for example, such sources may cause the gaze camera to be impacted and may reduce accuracy of the gaze detection. Accordingly, predictive pathing may be useful to reduce error in similar situations where there may otherwise be recorded errors and/or aberrations.

Further, predictions may not be limited only to a current player. For example, aggregate information from a large population of players may be aggregated together to refine the model for predictive pathing. The model may, for example, take into consideration the type of player, the type of interaction the player is having with the EGM 10, the characteristics of the player (e.g., height, gender, angle of incidence), among others.

In some embodiments, the predictive pathing model may also be utilized in the context of a game. For example, if the game includes aspects which may be selectively triggered based on various inputs, an input for triggering may include predicted pathways. In some embodiments, objects and/or layers may be modified and/or altered.

In some embodiments, the player may play an interactive game with EGM 10 in communication with a mobile device. Depending on the game data of the interactive game, the player may play the interactive game on EGM 10, on the mobile device, or on both. The player may play the interactive game using their eye gaze, eye gestures, movement, the interface of the mobile device, or any combination thereof. The player may play the interactive game using only the eye gaze of the player while the player holds on to the mobile device with one or more hands. The mobile device may, for example, be a computer, personal digital assistant, laptop, tablet, smart phone, media player, electronic reading device, data communication device, or a wearable device, virtual reality device, or any combination thereof. The mobile device may be a custom mobile device that may be in communication with EGM 10. The mobile device may be operable by a user and may be any portable, networked (wired or wireless) computing device including a processor and memory and suitable for facilitating communication between one or more computing applications of mobile device (e.g. a computing application installed on or running on the mobile device). A mobile device may be a two-way communication device with advanced data communication capabilities having the capability to communicate with other computer systems and devices. The mobile device may include the capability for data communications and may also include the capability for voice communications, in some example embodiments. The mobile device may have at least one data capture camera device to continuously monitor the eye gaze, eye gesture, or movement of the player and collect player eye gaze data, player eye gesture data, or player movement data.

The EGM 10 may include a wireless transceiver that may communicate with the mobile device, for example using standard WiFi or Bluetooth, or other protocol based on the wireless communication capabilities of the mobile device. The player may be able to play the interactive game while the mobile device is in communication with EGM 10. When connected to the EGM 10, the viewing area may be displayed on display device 12, 14 or on the screen of the mobile device, or both. The data capture camera device 25 on the mobile device may collect player eye gaze data, player eye gesture data, or player movement data, which may be processed by a game controller 44 of EGM 10 to determine a location of the eye gaze of the player relative to the viewing area displayed on the mobile device. The game controller 44 may trigger a control command to the display controller 52 to dynamically update the rendering of the viewing area based on the player eye gaze data, player eye gesture data, or player movement data. In response to the control command from the game controller 44, the display controller 52 may control the display device 12, 14, the mobile device, or both, in real-time or near real-time using the graphics processor 54 to dynamically update the rendering of the viewing area to provide a real-time or near real-time graphical animation effect displayed on the display device 12, 14 or the mobile device representative of a visual update to the game components in the viewing area, the visual update based on the player eye gaze data, player eye gesture data, or player movement data.

In some embodiments, the mobile device in communication with EGM 10 may be configured to be a display device that compliments display device 12, 14 when playing the interactive game. The player may interact with the interactive game through the interface of the mobile device, through the EGM 10, or any combination thereof. The interactive game environment, viewing area, and game components of the interactive game may be displayed on the mobile device, display device 12, 14, or any combination thereof.

In some embodiments, a terminal may be connected to one or more EGM 10 over a network. The terminal may serve as a registration terminal for setting up the communication between the mobile device and any EGM 10 connected to the network. Therefore, the player does not have to physically go to EGM 10 to set up the link and play the interactive game associated with EGM 10.

The host system 41 may store account data for players. The EGM 10 may communicate with host system 41 to update such account data, for example, based on wins and losses. In an embodiment, host system 41 stores the aforementioned game data, and EGM 10 may retrieve such game data from host system 41 during operation.

In some embodiments, the electronics on the various boards described herein may be combined onto a single board. Similarly, in some embodiments, the electronics on the various controllers and processors described herein may be integrated. For example, the processor of game controller 44 and graphics processor 54 may be a single integrated chip.

The EGM 10 may be configured to provide one or more player eye gaze, eye gesture, or movement interactions to one or more games playable at EGM 10. The enhancements may be to a primary interactive game, secondary interactive game, bonus interactive game, or combination thereof.

As shown, the EGM 10 may include a card reader 34 to identify a monetary amount conveyed by a player to the electronic gaming machine.

The EGM 10 may include at least one data storage device storing game data for at least one interactive game or at least one bonus interactive game, or both.

The EGM 10 may include graphics processor 54 to generate an interactive game environment and define a viewing area as a subset of the interactive game environment. The viewing area may have a plurality of game components based on the game data.

The EGM 10 may include display device 12, 14 to display via a user interface the viewing area having the plurality of game components.

The EGM 10 may include display controller 52 to control rendering of the viewing area on the display device 12, 14 using the graphics processor 54.

The EGM 10 may include at least one data capture camera device to continuously monitor eye gaze of a player to collect player eye gaze data.

The EGM 10 may include a game controller 44 for determining a location of the eye gaze of the player relative to the viewing area using the player eye gaze data and triggering a control command to the display controller 52 to dynamically update the rendering of the viewing area based on the player eye gaze data.

In response to detection of the control command, the display controller 52 controls the display device 12, 14 in real-time or near real-time using the graphics processor 54 to dynamically update the rendering of the viewing area to provide a real-time or near real-time graphical animation effect displayed on the display device 12, 14 representative of a visual update to the visible game components in the viewing area, the visual update based on the player eye gaze data.

In response to an outcome of the interactive game, the card reader 34 updates the monetary amount.

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used, such as a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a Random Access Memory (RAM), a read-only memory (ROM), an Erasable Programmable Read-Only Memory (EPROM or Flash memory), an appropriate optical fiber with a repeater, a portable Compact Disc Read-Only Memory (CD-ROM), an optical storage device, a magnetic storage device, or any suitable combination of the foregoing. In the context of this document, a computer readable storage medium may be any medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, Common Business-Oriented Language (COBOL) 2002, PHP: Hypertext Preprocessor (PHP), Advanced Business Application Programming (ABAP), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operations to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms (e.g., "one or more") as well, unless the context clearly indicates otherwise. It will be further understood that the terms "comprises" and/or "comprising," when used in this specification, specify the presence of stated features, operations, elements, and/or components, but do not preclude the presence or addition of one or more other features, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A gaming system comprising:
   a processor circuit; and
   a memory comprising machine-readable instructions that, when executed by the processor circuit, cause the processor circuit to:
   receive a plurality of images of an eye of a player of a gaming device captured by an image capture device of the gaming device at a plurality of respective times;
   generate, for each image of the plurality of images, gaze direction data indicative of a gaze direction of the eye of the player at the respective time;
   access a player database comprising player data for a plurality of players, the player data comprising, for each player, stored gaze data and a unique identifier corresponding to an identity of the player;
   based on the gaze direction data and the stored gaze data, determine a player parameter value corresponding to a player parameter for the player, the player parameter value comprising the unique identifier corresponding to the identity of the player;
   receive verification data indicative of the identity of the player;

based on the verification data, update the stored gaze data associated with the player to comprise the gaze direction data; and based on the player parameter value, modify a game feature of a wagering game at the gaming device.

2. The gaming system of claim 1, wherein the instructions further cause the processor circuit to determine, based on the gaze direction data, gaze pattern data corresponding to a gaze pattern of the player, and wherein the instructions that cause the processor circuit to determine the player parameter value of the player further cause the processor circuit to:

generate a correlation between the gaze pattern data and a stored gaze pattern of the stored gaze data corresponding to a stored player parameter value; and determine the player parameter value based on the correlation.

3. The gaming system of claim 2, wherein the gaze pattern data corresponds to a pattern of user interface elements being displayed by a display device.

4. The gaming system of claim 1, wherein the instructions further cause the processor circuit to:

determine, based on the gaze direction data and the plurality of respective times, gaze velocity data corresponding to a velocity of the eye of the player changing from a first gaze direction at a first time to a second gaze direction at a second time, wherein the instructions that cause the processor circuit to determine the player parameter value further cause the processor circuit to determine the player parameter value further based on the gaze velocity data.

5. The gaming system of claim 1, wherein the instructions that cause the processor circuit to modify the game feature further cause the processor circuit to enable the game feature of the gaming device for use by the player.

6. The gaming system of claim 1, wherein the gaze direction data corresponds to a first pattern of a first plurality of symbols being displayed by a display device, wherein the player data comprises a second pattern corresponding to the player, and wherein the instructions that cause the processor circuit to determine the player parameter value further cause the processor circuit to:

generate a correlation between the first pattern and the second pattern; and determine the unique identifier further based on the correlation.

7. The gaming system of claim 6, wherein the first pattern further corresponds to a plurality of game elements of the wagering game being displayed by the display device, wherein the second pattern further comprises a winning pattern associated with a winning game result of the wagering game, and wherein the instructions further cause the processor circuit to:

based on the correlation, determine that a winning result has occurred, and award a benefit associated with the winning result to the player.

8. The gaming system of claim 7, wherein the instructions further cause the processor circuit to:

receive verification data indicative of the identity of the player;

based on the verification data, generate an updated correlation between the first pattern and the second pattern; and determine a different unique identifier corresponding to a different player further based on the updated correlation.

9. The gaming system of claim 1, wherein the player data further comprises, for each player, stored gameplay data indicative of historical play of a wagering game by the player, and wherein the instructions that cause the processor circuit to determine the player parameter value of the player further cause the processor circuit to:

determine current gameplay data based on play of the wagering game by the player at the gaming device;

generate a correlation between the current gameplay data and stored gameplay of the stored gameplay data corresponding to a stored player parameter value; and determine the player parameter value based on the correlation.

10. The gaming system of claim 1, wherein the player data further comprises, for each player, stored attention level data indicative of an attention level of the player corresponding to the stored gaze data, and wherein the instructions that cause the processor circuit to determine the player parameter value of the player further cause the processor circuit to:

generate a correlation between the gaze direction data and the stored attention level data; and determine the player parameter value based on the correlation, wherein the player parameter value further comprises an attention level value corresponding to a current attention level of the player.

11. The gaming system of claim 10, wherein the instructions that cause the processor circuit to modify the game feature further cause the processor circuit to:

determine that the attention level value meets a predetermined attention level threshold; and based on the attention level value meeting the predetermined attention level threshold, enable the game feature of the gaming device for use by the player.

12. The gaming system of claim 10, wherein the instructions that cause the processor circuit to modify the game feature further cause the processor circuit to:

determine that the attention level value fails to meet a predetermined attention level threshold; and based on the attention level value failing to meet the predetermined attention level threshold, disable the game feature of the gaming device for use by the player.

13. A gaming device comprising:

a display device;

an image capture device to capture a plurality of images of an eye of a player of the gaming device at a plurality of respective times;

a processor circuit; and a memory comprising machine-readable instructions that, when executed by the processor circuit, cause the processor circuit to:

generate gaze direction data indicative of a plurality of gaze directions of an eye of a player of the gaming device, the gaze direction data corresponding to a first pattern of a first plurality of symbols being displayed by the display device;

access a player database comprising player data for a plurality of players, the player data comprising, for each player, stored gaze data, a unique identifier corresponding to an identity of the player, and a second pattern corresponding to the player;

based on the gaze direction data and the stored gaze data, generate a correlation between the first pattern and the second pattern and determine the unique identifier further based on the correlation; and based on the unique identifier, cause a game feature of a wagering game at the gaming device to be modified; and update the stored gaze data associated with the player to comprise the gaze direction data.

14. The gaming device of claim 13, wherein the instructions that cause the processor circuit to update the stored gaze data further cause the processor circuit to:

receive, from the gaming device, verification data indicative of an identity of the player; and update the stored gaze data further based on the verification data.

15. A method comprising:

capturing, by an image capture device, plurality of images of an eye of a player of a gaming device at a plurality of respective times;

generating, for each image of the plurality of images, gaze direction data indicative of a gaze direction of the eye of the player at the respective time corresponding to the image;

accessing a player database comprising player data for a plurality of players, the player data comprising, for each player, stored gaze data and a unique identifier corresponding to an identity of the player;

based on the gaze direction data and the stored gaze data, determining a player parameter value corresponding to a player parameter for the player, the player parameter value comprising the unique identifier corresponding to the identity of the player;

receiving verification data indicative of the identity of the player;

based on the verification data, updating the stored gaze data associated with the player to comprise the gaze direction data; and based on the player parameter value, modifying a game feature of a wagering game at the gaming device.

16. The method of claim 15, wherein the player data further comprises, for each player, stored emotional state data indicative of an emotional state of the player corresponding to the stored gaze data, and wherein the player parameter value of the player further comprises:

generating a correlation between the gaze direction data and the stored emotional state data; and determining the player parameter value based on the correlation, wherein the player parameter value further comprises an emotional state value corresponding to a current emotional state of the player.

17. The method of claim 15, further comprising:

determining, based on the gaze direction data and the player data, that the player is a human player; and in response to determining that the player is a human player, enabling the game feature of the wagering game.

18. The method of claim 15, further comprising:

displaying a message on a display device of the gaming device;

determining, based on the gaze direction data, that the player has read the message; and in response to determining that the player has read the message, enabling the game feature of the wagering game.

* * * * *